(12) United States Patent
Oberheim

(10) Patent No.: US 8,653,764 B2
(45) Date of Patent: Feb. 18, 2014

(54) ELECTRONIC ORBIT CONTROL FOR SAWS

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 1193 days.

(21) Appl. No.: 12/543,077

(22) Filed: Aug. 18, 2009

(65) Prior Publication Data

US 2011/0043153 A1 Feb. 24, 2011

(51) Int. Cl.
*H02P 7/00* (2006.01)
*H02K 7/06* (2006.01)
*B23D 51/16* (2006.01)
*B27B 19/04* (2006.01)

(52) U.S. Cl.
USPC ............... 318/115; 318/119; 173/2; 173/176; 173/217

(58) Field of Classification Search
USPC ........ 173/2, 114, 117, 217, 176; 30/392, 393; 310/12.14; 74/110; 318/14, 15, 115, 318/119, 135
See application file for complete search history.

(56) References Cited

U.S. PATENT DOCUMENTS

| | | | |
|---|---|---|---|
| 4,628,605 A | 12/1986 | Clowers | |
| 5,025,562 A | 6/1991 | Palm | |
| 5,050,307 A | 9/1991 | Palm | |
| 5,595,250 A * | 1/1997 | Bourke | 173/29 |
| 5,755,293 A * | 5/1998 | Bourke | 173/29 |
| 6,249,979 B1 | 6/2001 | Bednar et al. | |
| 6,424,112 B1 | 7/2002 | Schauer | |
| 6,678,959 B1 * | 1/2004 | Phillip et al. | 30/277.4 |
| 6,729,412 B2 * | 5/2004 | Shinohara | 173/2 |
| 6,751,875 B2 * | 6/2004 | Jones | 30/392 |
| 6,868,918 B2 * | 3/2005 | Shinohara | 173/2 |
| 7,234,243 B2 | 6/2007 | Tam et al. | |
| 2003/0006050 A1 * | 1/2003 | Shinohara | 173/4 |
| 2008/0229590 A1 * | 9/2008 | Garrett | 30/394 |
| 2009/0265943 A1 * | 10/2009 | Miller et al. | 30/380 |

* cited by examiner

*Primary Examiner* — Eduardo Colon Santana
(74) *Attorney, Agent, or Firm* — Maginot, Moore & Beck

(57) ABSTRACT

A power saw having a reciprocating blade, including a housing having a handle portion for holding the saw; a variable speed motor in the housing for driving the reciprocating blade; a mechanism configured to move the reciprocating blade in a non-linear path; an electronic controller for controlling the operation of the motor; a trigger switch configured to provide an electrical signal to the controller that is proportional to the amount of travel that the switch is moved, wherein the signal causes the controller to operate the motor through a range of operating speeds; and a mode switch operatively connected to the controller and including a first mode providing normal operating speeds responsive to the trigger switch being selectively moved through its range of travel, and a second mode wherein the operating speeds are within the range of about 50% to about 80% of the normal operating speeds.

6 Claims, 2 Drawing Sheets

Power Saw Speed Adjustment System

ELECTRONIC ORBIT CONTROL FOR SAWS

BACKGROUND OF THE INVENTION

The present invention generally relates to power hand tools, and more particularly, to power reciprocating tools.

Reciprocating tools that are motor driven, such as saber saws, reciprocating saws and the like are usually driven by electric motors that have a rotating output shaft. The rotating motion is translated into reciprocating motion for moving a saw blade or the like in a reciprocating manner. In some reciprocating saws, the saw reciprocates in an orbital or non-linear motion, as opposed to a straight line motion. The orbital motion is commonly characterized by a forward (i.e., opposite the cutting direction) motion of the saw blade as the saw blade is extended away from the saw on the cutting stroke, and a corresponding rearward (i.e., in the cutting direction) motion of the saw blade as the saw blade is being retracted toward the saw on the return stroke. The result is a circuitous, or orbital, path of the blade. Such orbital motion is believed to improve the speed at which the saw cuts a workpiece by driving the saw blade into the workpiece during the cutting stroke and withdrawing the saw blade from the workpiece during the return stroke.

In some instances, it is desirable to toggle orbit action off. For example, when performing a precise cut with orbit action on, one may experience bouncing of the saw blade. In this case, one technique known in the art is to turn orbit action off using a mechanical switch. However, this often results in a slower cutting process after the cut is started.

An alternative technique is to leave orbit action on and include a variable speed control switch. For instance, when cutting wood, plaster board or soft metal in a precise manner, one can start a cut at a very low speed, then once the cut is precisely located, go to full speed to complete the cut. As such, the concern that the orbit function will cause the blade to bounce off the material being cut is negated by the variable speed control. However, variable-speed control is only as consistent as one's ability to depress the trigger slightly while the saw bites into the material being cut. Additionally, there are some instances when it is desirable to have the orbit action effects completely negated such as when cutting hard metals.

SUMMARY OF THE INVENTION

The present electronic orbit or non-linear control for saws addresses the drawbacks of conventional operating techniques. More specifically, the preferred embodiment is directed to a power saw having a reciprocating blade, including a housing having a handle portion for holding the saw; a variable speed motor in the housing for driving the reciprocating blade; a gear mechanism that is configured to move the reciprocating blade in a non-linear path to provide a varying force through a cutting stroke; an electronic controller for controlling the operation of the motor; a variable speed trigger switch operatively connected to the controller and configured to provide an electrical signal to the controller that is proportional to the amount of travel that the switch is moved through a range of travel positions from an off position to a full travel position, where the signal causes the controller to operate the motor through a range of operating speeds; and a mode switch operatively connected to the controller and being configured to be set in at least two modes of operation, a first mode providing normal operating speeds responsive to the trigger switch being selectively moved through its range of travel, and a second mode wherein the operating speeds are within the range of about 50% to about 80% of the normal operating speeds.

Also provided is a method for controlling speed of an electric motor associated with a hand tool, the method including an electronic controller receiving a variable trigger input signal based on a variable incremental position of a trigger switch included with the hand tool; the electronic controller receiving a non-linear HIGH/LOW input signal based on the position of a non-linear HIGH/LOW switch included with the hand tool; the electronic controller determining a motor output speed based on the trigger input signal; and the electronic controller reducing the output speed by a discrete value if the non-linear input signal is set to LOW.

DETAILED DESCRIPTION OF THE EMBODIMENTS

The preferred embodiment of the present invention is an electronic speed adjustment system for a reciprocating tool such as a reciprocating saw. The present invention is also applicable for other types of tools that have a reciprocating action. As previously mentioned, it is desirable to have orbital action off in certain situations such as when initiating a precision cut or when cutting hard metals. In most commercially available saws, one must control the orbit action using a mechanical orbit ON/OFF switch. Unlike current commercially available saws, the preferred embodiment of the present invention leaves orbit on, but uses an electronic orbit ON/OFF switch that reduces the saw blade speed by a discrete amount, and thus reduces the negative effects of the orbit action.

Figure 1:
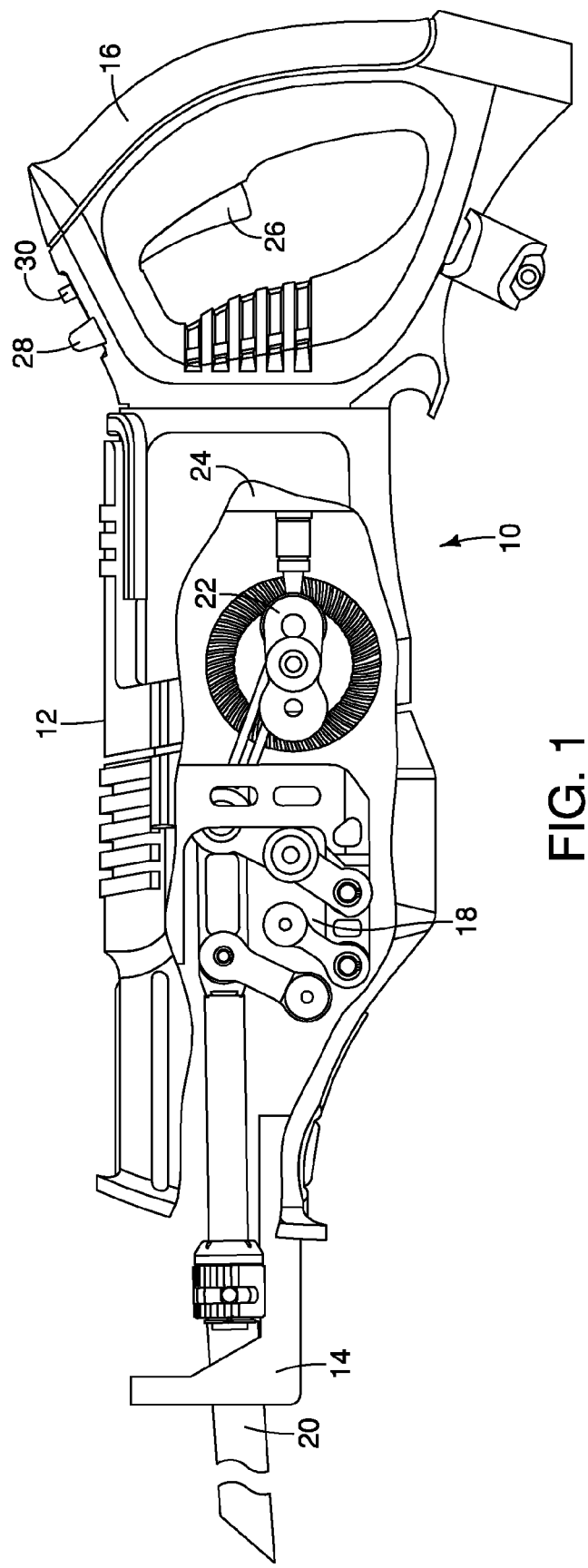
FIG. 1 is a side view of a preferred embodiment of the present invention incorporated into a reciprocating saw.

Turning now to the drawings, as shown in FIG. 1, a reciprocating saw, indicated generally at 10, has an outer housing 12 which includes a nose portion 14 and a rear handle 16. The saw has a variable speed motor 18 in the housing 12 for driving a reciprocating blade 20. Also included is a gear mechanism 22 configured to move the reciprocating blade 20 in a non-linear path to provide a varying force through a cutting stroke. An electronic motor controller 24 is provided for controlling the operation of the motor 18. In this configuration, the motor is preferably electric.

A variable speed trigger switch 26 is operatively connected to the controller 24 and configured to provide an electrical signal to the controller that is proportional to the amount of travel that the switch is moved through a range of travel positions from an off position to a full travel position. An example of such a speed control circuit is disclosed in U.S. Pat. No. 6,424,112, which is specifically incorporated by reference herein. As should be appreciated, the signal causes the controller 24 to operate the motor 18 through a range of operating speeds. Also included in the preferred embodiment is a speed dial 28 operatively connected to the controller 24 and configured to provide an adjustable maximum speed of operation when the trigger switch 26 is moved to its full travel position. However, the speed dial 28 may be excluded based on design preference.

In addition to the trigger 26 and optional speed dial 28, a mode switch 30 operatively connected to the controller 24 is also provided. The mode switch 30 is configured to be set in at least two modes of operation: a first mode providing normal operating speeds responsive to the trigger switch 26 being selectively moved through its range of travel, and a second mode wherein said operating speeds are within a percentage range of said normal operating speeds. The preferred range is within about 50% to about 80% of normal operating speeds. However, other ranges are contemplated based on application.

Figure 2:
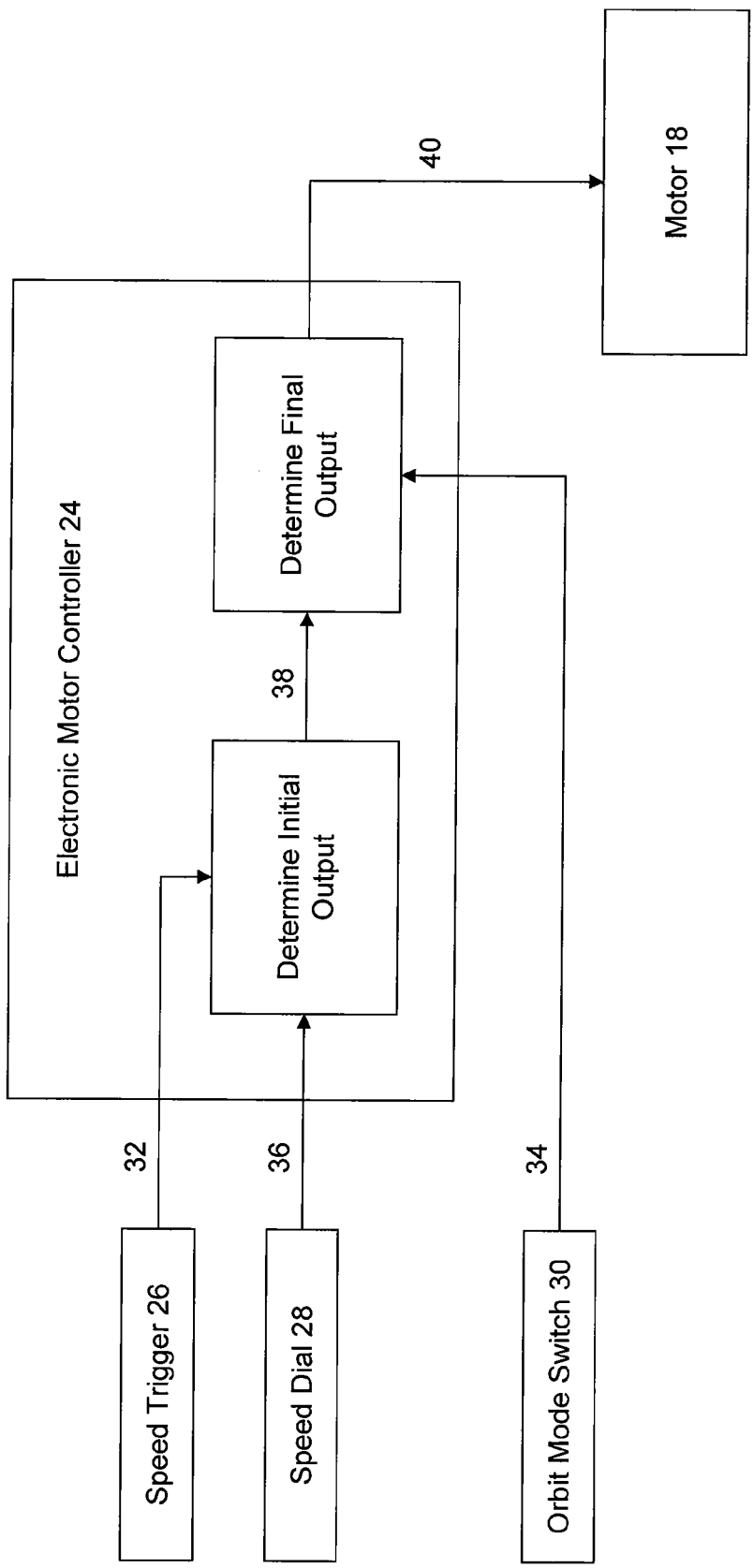
FIG. 2 is a flow diagram of the power saw speed adjustment system of the preferred embodiment.

A method for controlling the speed of an electric motor 18 associated with a hand tool 10 is also included. Referring now to FIG. 2, first, a trigger input signal 32 based on the incremental position of a trigger 26, and an orbit HIGH/LOW input signal 34 based on the position of an orbit HIGH/LOW switch 30, are received by the electronic controller 24. If the speed dial 28 is included with the tool 10, the electronic control 24 will also receive a speed dial signal 36. The controller 24 then determines an initial output speed signal 38 based on the trigger input signal 32 and the speed dial input signal 36. Next, a final output speed signal 40 is calculated based on the initial output signal 38 and the orbit HIGH/LOW signal 34. If the orbit HIGH/LOW signal 34 is LOW, then the final output speed signal 40 is reduced by a predetermined discrete value. Likewise, if the orbit HIGH/LOW signal 34 is HIGH, then the final output speed signal is not modified. Preferably, the discrete value is in the range of about 20% to about 50% of normal operating speeds. Finally, the speed of the motor 18 is adjusted based on the final output speed signal 40. It should also be appreciated that the above method may also be a program stored on a computer-readable storage medium and executed by an electronic motor controller such as a microprocessor or ASIC included on the controller 24.

Optionally, the electronic control 24 may include circuitry so that if the output speed signal 40 temporarily exceeds a maximum threshold value, the speed of the motor 18 is adjusted to the maximum threshold value. In addition, the electronic control 24 may also include circuitry so that the output speed signal 40 causes the motor 24 to gradually adjust speed based on the output speed signal and a current speed of the motor. These features are described more fully in U.S. Pat. No. 6,424,112 mentioned above.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power saw having a reciprocating blade, comprising:
a housing having a handle portion for holding the saw;
a variable speed motor in said housing for driving the reciprocating blade;
a gear mechanism that is configured to move said reciprocating blade in a non-linear path to provide a varying force through a cutting stroke;
an electronic controller for controlling the operation of said motor;
a variable speed trigger switch provided on the handle portion of the housing, the trigger switch being operatively connected to said controller and configured to provide an electrical signal to said controller that is proportional to the amount of travel that the switch is moved through a range of travel positions from an off position to a full travel position, wherein said signal causes said controller to operate said motor through a range of operating speeds based on the travel position of the trigger switch with a maximum operating speed being reached when said trigger switch is at said full travel position,
a maximum operating speed switch provided on an exterior of the housing at a location that is spaced apart from said trigger switch, said maximum operating speed switch being operatively connected to said controller and configured to set the maximum operating speed to one of a plurality of different operating speeds based on a position of the maximum operating speed switch, and
a mode switch provided on the exterior of the housing at a location spaced apart from the trigger switch and the maximum operating speed switch, the mode switch being operatively connected to said controller and configured to set an operating mode for the power saw to one of at least two modes of operation depending on a position of the mode switch, the at least two modes including a first mode providing normal operating speeds responsive to said trigger switch being selectively moved through its range of travel, and a second mode wherein said operating speeds are within the range of about 50% to about 80% of said normal operating speeds.

2. A method for controlling speed of an electric motor associated with a hand tool, the method comprising:
an electronic controller receiving a variable trigger input signal based on a variable incremental position of a trigger switch provided on a handle portion of a housing of the hand tool;
said electronic controller receiving a speed dial input signal based on a position of a speed dial provided on an exterior of the housing of the power tool at a location spaced apart from the trigger switch, the speed dial input signal representing a maximum operating speed for the hand tool;
said electronic controller receiving a HIGH/LOW input signal based on a position of a HIGH/LOW switch provided on the exterior of the housing of the hand tool at a location spaced apart from the trigger switch and the speed dial;
said electronic controller determining a motor output speed based on the trigger input signal and the speed dial input signal; and
said electronic controller reducing said determined motor output speed by a discrete value if said orbit input signal is set to LOW.

3. The speed controlling method of claim 2 wherein if said output speed temporarily exceeds a maximum threshold value, said electronic controller adjusts said output speed of the electric motor to the maximum threshold value.

4. The speed controlling method of claim 2 wherein the discrete value is within the range of about 20% and about 50% of the determined motor output speed.

5. A non-transitory, computer-readable storage medium including programmed instructions stored thereon for execution by an electronic motor controller and for causing the motor controller to perform a method of controlling speed of an electric motor associated with a hand tool, the method comprising:
receiving a trigger input signal based on a position of a trigger included with the hand tool;
receiving a speed dial input signal based on a position of a speed dial on the hand tool, the speed input signal representing a maximum operating speed for the hand tool;
receiving an orbit HIGH/LOW input signal based on a position of a HIGH/LOW switch included with the hand tool;

determining an initial output speed based on the trigger input signal and the speed dial input signal;

determining a final output speed based on the initial output speed and the orbit input signal by setting the final output speed to the initial output speed if the orbit input signal is set to HIGH and by setting the final output speed to the initial output speed reduced by a discrete value if the orbit input signal is set to LOW; and adjusting the speed of the electric motor based on the final output speed.

6. The storage medium as defined in claim 5 wherein said electronic motor controller is a microprocessor and said programmed instructions are configured for execution by said microprocessor.

\* \* \* \* \*